United States Patent [19]

Bachot et al.

[11] Patent Number: 4,939,028

[45] Date of Patent: Jul. 3, 1990

[54] MICROPOROUS COMPOSITES AND ELECTROLYTIC APPLICATIONS THEREOF

[75] Inventors: Jean Bachot, Bourg la Reine; Jean-Claude Kiefer, Blaincourt les Precy, both of France

[73] Assignee: Rhone-Poulenc Chimie de Base, Courbevoie, France

[21] Appl. No.: 892,432

[22] Filed: Aug. 4, 1986

[30] Foreign Application Priority Data

Aug. 2, 1985 [FR] France .............................. 85 11857

[51] Int. Cl.$^5$ .......................... B32B 3/26; B32B 9/00
[52] U.S. Cl. .................................. 428/311.5; 428/288; 428/311.1; 428/315.5; 428/312.2; 428/317.1; 428/317.7; 428/317.9; 428/367; 428/408; 428/290
[58] Field of Search ............ 428/408, 367, 288, 311.1, 428/311.5, 315.5, 315.9, 317.9, 317.7, 368, 312.2, 290, 304.4; 204/296; 162/164.1

[56] References Cited

U.S. PATENT DOCUMENTS

| | | | |
|---|---|---|---|
| 4,434,206 | 2/1984 | Fukuda et al. | 428/408 |
| 4,567,086 | 6/1986 | Fukuda et al. | 428/408 |
| 4,647,360 | 3/1987 | Waters et al. | 204/296 |
| 4,666,755 | 5/1987 | Shigeta et al. | 428/408 |
| 4,743,349 | 5/1988 | Bachot et al. | |

FOREIGN PATENT DOCUMENTS

| | | | |
|---|---|---|---|
| 0132425 | 1/1985 | European Pat. Off. | |
| 2128395 | 4/1984 | United Kingdom | 428/408 |

*Primary Examiner*—Lorraine T. Kendell
*Attorney, Agent, or Firm*—Burns, Doane, Swecker & Mathis

[57] ABSTRACT

Microporous composites adopted for electrolytic applications, e.g., as cathodes in the electrolysis of sodium chloride, are comprised of a regular, homogeneous and consolidated microporous deposit of monodispersed carbon fibers on a perforated rigid support substrate therefor, said carbon fibers having a distribution by length such that the mean length of at least 80% of the individual fibers, plus or minus 20%, corresponds to the mean length of said fibers.

12 Claims, No Drawings

MICROPOROUS COMPOSITES AND ELECTROLYTIC APPLICATIONS THEREOF

BACKGROUND OF THE INVENTION

1. Field of the Invention

The present invention relates to a novel microporous consolidated material, or composite, and, more especially, to such novel composite comprising stacked fibers, including carbon fibers, deposited onto a perforated rigid substrate.

This invention also relates to a process for the production of such consolidated material and to various uses thereof, notably in the electrolysis of sodium chloride.

The microporous material according to the invention is especially useful for the manufacture of slab electrodes of the "glove finger" type, and for the production of microporous separators, such as diaphragms employed in electrolysis.

2. Description of the Prior Art

It is known to this art that microporous materials of the foregoing type should generally satisfy several requirements:

(1) They should have a microporosity which can be adjusted in terms of pore size and in terms of pore size distribution;

(2) When they are used in the fabrication of the cathodic component of an electrolytic cell, such as for the electrolysis of sodium chloride, their thickness should be small : on the order of 0.1 mm to 5 mm, and they should have a large surface area which may exceed several $m^2$.

Additionally, it should be possible to prepare these microporous materials by deposition onto a rigid base structure which has a great number of apertures or perforations and large perforation or hole diameters.

These microporous materials are typically produced by filtration of a suspension of fibers and binders onto the support under vacuum.

The properties of such a material depend upon a certain number of parameters, especially on the nature and the concentration:

(i) of the fibrous materials in suspension;

(ii) of the surfactants and various additives incorporated therein;

(iii) of the pore-forming agents incorporated therein.

According to the prior art, a fibrous material having a polydisperse distribution of fiber lengths, i.e., a broad spectrum of fiber sizes and lengths, is employed. Thus, at the beginning of the deposition of the fibrous material, the long fibers form a kind of first layer which then arrests or stops the shorter fibers from penetrating therein. A high level of prevention of fibrous materials is thus obtained; unfortunately, often at the expense of the quality of the microporous material. The latter, especially in the case of use for electrolysis, should be of small thickness; moreover, it should be regular.

Furthermore, it too is known to this art that the concentration of fibrous material should not fall below a certain minimum value at the time of deposition. Otherwise, the homogeneity and the stability of the suspension are adversely affected.

Stated differently, in order to obtain good deposition, the content in fibrous material per unit volume must not change during the filtration process. This is a critical point.

Hence, this art has long been the subject of attempts to improve the quality of the suspension by varying the parameters mentioned above, viz., the nature and the concentration of the fibrous materials, of the surfactants and additives, and of the pore-forming agents.

But it is also known that the possibilities in this direction are limited by the constraints related to the characteristics of the microporous materials, especially those which are imposed by their use in electrolysis.

Finally, with a view to producing microporous materials which perform at higher levels and which are more profitable from an economic point of view, the present inventors have heretofore proposed microporous materials containing conductive fibers, such as carbon or graphite fibers.

SUMMARY OF THE INVENTION

It has now surprisingly been found, and this constitutes a major object of the present invention, that such carbon fibers, used under specific conditions, provide an altogether new and unexpected function which relates to the structural characteristics of the microporous material, independent of their conducting property.

Briefly, the present invention features microporous materials which are comprised of carbon fibers characterized by a monodisperse distribution of fiber lengths.

By "monodisperse" distribution as utilized herein, there is intended a distribution of fiber lengths such that the length of at least 80%, and advantageously 90%, of the fibers corresponds to that of the mean length of fibers within ±20%, and advantageously within ±10%.

In one embodiment, the invention is a microporous material which comprises a regular, homogeneous and consolidated deposit of monodispersed carbon fibers having a distribution by length such that the length of at least 80% of the individual fibers, plus or minus 20%, corresponds to the mean length of the fibers.

DETAILED DESCRIPTION OF THE PREFERRED EMBODIMENTS OF THE INVENTION

More particularly according to the present invention, the subject carbon fibers are advantageously in the form of filaments, the diameters of which are less than 1 mm, preferably ranging from $10^{-5}$ to 0.1 mm, and the lengths of which are greater than 0.1 mm, preferably ranging from 1 to 20 mm, and said fibers having a resistivity equal to or less than 0.4 ohm.cm.

In a preferred embodiment of the invention, the lengths of the fibers do not exceed the diameters of the perforations in the perforated rigid substrate onto which the fibrous layer is deposited.

Thus, the microporous material according to this invention comprises:

(i) a perforated, rigid support substrate which may define an elementary cathode having one or more planar face surfaces, or face surfaces in the form of cylinders deemed "glove fingers", thus providing an open surface; and (ii) a fibrous structure deposited-therein which comprises the carbon fibers according to the invention, if required in combination with other fibers such as asbestos fibers, advantageously consolidated with binders such as polymeric binders, themselves advantageously comprised of fluorinated polymers.

Consistent herewith, by the expression "fluorinated polymer" is intended a homopolymer or a copolymer, derived at least in part from olefinic monomers substituted with fluorine atoms, or substituted with a combination of fluorine atoms and at least one chlorine, bromine or iodine atom per monomer.

Exemplary of such fluorinated homopolymers or copolymers, representative are the polymers and copolymers derived from tetrafluoroethylene, hexafluoropropylene, chlorotrifluoroethylene or bromotrifluoroethylene.

Such fluorinated polymers may also comprise up to 75% (in mols) of recurring units derived from other ethylenically unsaturated monomers containing at least as many fluorine atoms as carbon atoms, such as, for example, vinylidene difluoride, vinyl and perfluoroalkyl esters, such as perfluoroalkoxyethylenes.

Of course, more than one fluorinated homopolymer or copolymer as defined above may be used according to the invention. Likewise, a small amount, for example, up to 10 to 15% by weight, of polymers containing no fluorine atoms in their molecular structure, such as, for example, polypropylene, may be combined with the aforesaid fluorinated polymers without departing from the scope of the invention.

The fluorinated polymer may constitute up to 60% of the total weight of the deposited layer, typically from 5 to 50% of the total weight. The fluorinated polymer according to the invention is advantageously in the form of an aqueous dispersion (latex) containing, in general, from 30 to 70% of the dry polymer, the particle size of which preferably ranging from 0.1 to 5 $\mu$m, and more preferably from 0.1 to 1 $\mu$m.

A fluorinated polymer in the form of a dry powder, or in fibrous form, may be used without departing from the scope of the present invention.

The present invention also features a process for the preparation of a microporous material by depositing a suspension containing the binder, the fibers and, if required, a pore-forming agent, onto a perforated rigid substrate, and, where appropriate, the pore-forming agent is then removed. The fibers in suspension include the characteristic carbon fibers of monodisperse length distribution.

Unexpectedly, it has been determined that an excellent level of fiber stoppage could be achieved, on the one hand, but that this level of stoppage, or fiber arrest, decreased gradually, and not abruptly, when nearing the shorter lengths of fibers, on the other.

This determination is of considerable practical value.

In fact, it is then possible not only to prepare microporous materials displaying high performance at small thicknesses, but also to recycle the suspension as such, as no deleterious variations are detected in the mean length of the fibers in the recycled suspension.

In order to further illustrate the present invention and the advantages thereof, the following specific examples are given, it being understood that same are intended only as illustrative and in nowise limitative.

EXAMPLES 1 TO 5:

Deposition of graphite fibers having a polydisperse distribution of fiber lengths:

(A) Preparation of the suspension:

| | | | |
|---|---|---|---|
| (i) | Softened H$_2$O | 7,000 g | |
| (ii) | Short chrysotile asbestos fibers having lengths ranging from 1 to 5 mm | 37 g | Added together under rotary stirring for 30 min |
| (iii) | Ground graphite wadding | 63 g | |
| (iv) | Sodium dioctylsulfosuccinate (65% strength aqueous solution) | 1 g | |
| (v) | Polytetrafluoroethylene (PTFE) in the form of a 60% solids content latex | 60 g | |

(B) Deposition onto a "glove finger" type grid:

After being permitted to stand for 48 hours, the suspension was stirred again before filtration through an elementary cathode consisting of a braided and laminated iron grid — diameter of wires, 2 mm; aperture size, 2 mm — in the form of a "glove finger".

The suspension was filtered according to the following vacuum cycle: immersion for 1 min, followed by successive stages of increasing vacuum (in steps of 2,000 pa) for 1 min.

The composite material resulting from such filtration was then consolidated by drying at 100° C., followed by fusion at 350° C. for 7 to 10 min.

(C) Effect of the length of the graphite fibers:

The level of stoppage of the solids in suspension (fibers/polymer) on the cathodes during the filtration essentially depended on the mean length of the fibers and the distribution of the fiber lengths.

As is reported in the following Table I, the level of stoppage is from 80 to 90%, followed by a rapid decrease due to the formation of holes and uncovered areas or zones when the mean fiber length decreases significantly:

TABLE I

| | GROUND GRAPHITE WADDING | | | | | | | Level of Stoppage (%) | Quality of the resulting deposit |
|---|---|---|---|---|---|---|---|---|---|
| | Mean | Distribution of fiber lengths | | | | | | | |
| Example | Length mm | <0.5 mm | 0.5-1 mm | 1-1.5 mm | 1.5-2 mm | 2-2.5 mm | 2.5-3 mm | >3 mm | | |
| 1 | ≈3 | | ←15→ | | | 10 | 25 | 50 | 84 | unacceptable |
| 2 | ≈2.5 | | ←10→ | | 10 | 35 | 30 | 15 | 87 | acceptable |
| 3 | ≈2 | | ←9→ | 15 | 30 | 35 | 10 | <1 | 81 | homogeneous |
| 4 | ≈1.5 | 5 | 20 | 30 | 35 | 10 | 2 | — | 42 | uncovered zone |
| 5 | ≈1 | 15 | 35 | 45 | 8 | <1 | — | — | — | practically no deposition |

The level of stoppage was good for lengths ≧2 mm. However, when the mean fiber length increased significantly, the quality of the suspension and the deposit deteriorates quickly. In all cases, the decrease in the level of stoppage was sudden as soon as the mean fiber length was <2 mm.

EXAMPLES 6 TO 11:

Deposition of graphite fibers having a monodisperse distribution of fiber lengths:

The suspensions and the depositions were carried out under exactly the same conditions as in Examples 1 to 5. Only the distribution of fiber lengths of the graphite fibers was modified. In these Examples 6 to 11, at least 95% of the fibers had lengths equal to the mean value ±10%. This distribution, in contrast with the distributions commonly used for carrying out these depositions, enabled, in the case of graphite fibers, significant improvements to be achieved, as demonstrated by the results reported in the following Table II:

TABLE II

| Example | GRAPHITE FIBERS IN % | | | | | | Level of Stoppage (%) | Quality of the resulting deposit |
|---|---|---|---|---|---|---|---|---|
| | <1 | 1.25 mm | 1.5 mm | 1.75 mm | 2 mm | 2.5 mm | 3.0 mm | |
| 6 | — | — | — | — | — | — | ≧95 | 86 | acceptable |
| 7 | — | — | — | — | — | ≧95 | — | 83 | homogeneous |
| 8 | — | — | — | — | ≧95 | — | — | 80 | homogeneous |
| 9 | — | — | — | ≧95 | — | — | — | 72 | homogeneous |
| 10 | — | — | ≧95 | — | — | — | — | 60 | homogeneous |
| 11 | — | ≧95 | — | — | — | — | — | 35 | some holes |

The deposition was regular and homogeneous over the entire range of fiber lengths. The level of stoppage decreased gradually and no longer abruptly, for fibers ≦2 mm. Moreover, the fraction of the solids recovered in the filtrates closely approximated that in the initial suspension, whereas in Examples 1 to 5 a significant decrease in the mean fiber lengths was observed. Under these conditions, the filtrates can be recycled practically as such, with no adverse change in the quality of the suspensions and the deposits.

Finally, and most importantly, these examples demonstrate a significant advantage of the invention which cannot be achieved according to the prior art.

One prior art difficulty is in the adjustment of the thickness of the conductive deposit, which should be small.

In the case of depositions onto hollow cathodes, the inner volume of which is significant (dead volume), and if the levels of stoppage are still ≧80%, the weight of the fibers deposited may be limited to a value less than that of the fibers contained in the volume of suspension which filled the dead volume of the cathode used, that is, not exceeding 80% of this value. This leads to minimum thicknesses which may be greater than the desired final values. In contrast, the present invention enables the thickness of the fibrous layer to be controlled by varying the level of stoppage.

While this invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A microporous material comprising a regular, homogeneous and consolidated deposit of monodispersed carbon fibers, said carbon fibers having a distribution by length such that the length of at least 80% of the individual fibers corresponds to the means length of said fibers to within plus or minus 20%.

2. The microporous material as defined by claim 1, said carbon fibers having a distribution by length such that the length of at least 80% of the individual fibers corresponds to the mean length of said fibers to within plus or minus 10%.

3. The microporous material as defined by claim 1, said carbon fibers having a distribution by length such that the length of at least 90% of the individual fibers corresponds to the means length of said fibers to within plus or minus 20%.

4. The microporous material as defined by claim 1, said carbon fibers having a distribution by length such that the length of at least 90% of the individual fibers corresponds to the mean length of said fibers to within plus or minus 10%.

5. The microporous material as defined by claim 1, said carbon fibers comprising filaments having diameters of less than 1 mm, lengths greater than 0.1 mm, and a resistivity no greater than 0.4 ohm.cm.

6. The microporous material as defined by claim 5, said filaments having diameters ranging from $10^{-5}$ to 0.1 mm, and lengths ranging from 1 to 20 mm.

7. The microporous material as defined by claim 1, comprising a consolidating amount of a binder for said fibers.

8. The microporous material as defined by claim 7, comprising a polymeric binder.

9. The microporous material as defined by claim 8, comprising a fluoropolymeric binder.

10. The microporous material as defined by claim 9, comprising from 5 to 50% by weight of said fluoropolymeric binder.

11. The microporous material as defined by claim 7, further comprising asbestos fibers.

12. A microporous material comprising a regular, homogenous and consolidated deposit of monodispersed carbon fiber filaments, and a fluoropolymeric binder for said filaments;

wherein said filaments have a distribution by length such that the length of at least 80% of the individual filaments corresponds to he mean length of the filaments to within plus or minus 20%;

wherein said filaments have diameters of from about $10^{-5}$ to about 0.1 mm, lengths ranging from about 1 to about 20 mm, and a resistivity no greater than about 0.4 ohm.cm.; and wherein said fluoropolymeric binder comprises from about 5% by weight of the microporous material.

* * * * *